UNITED STATES PATENT OFFICE.

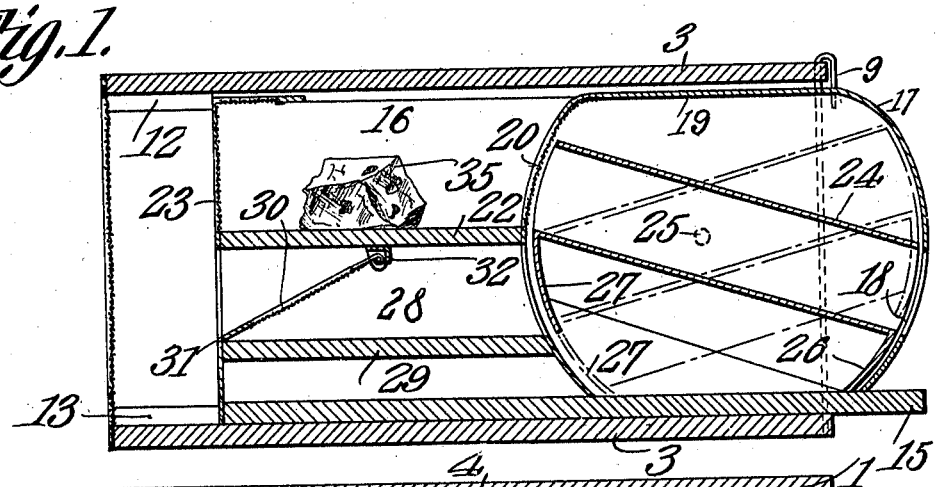
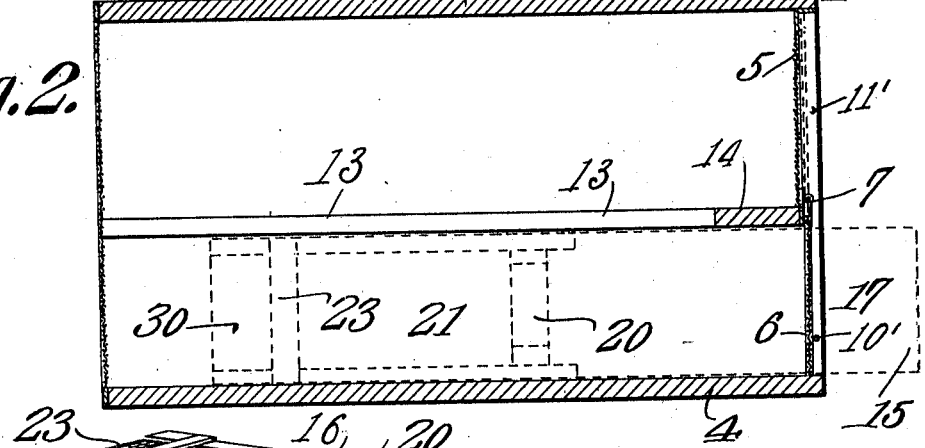
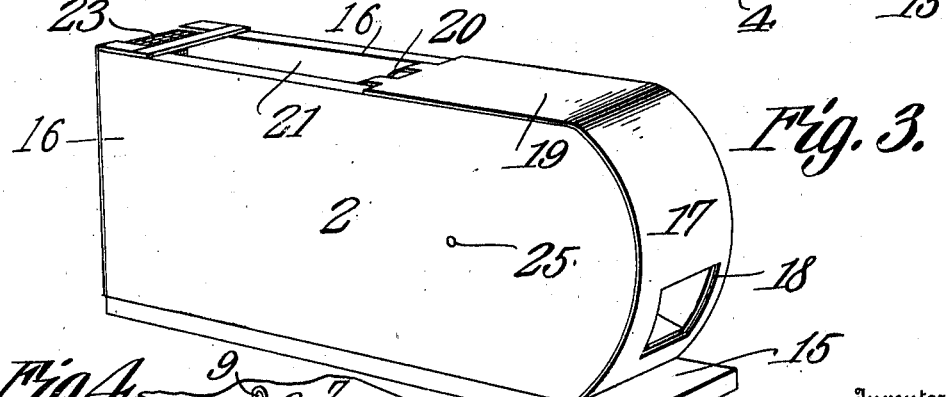
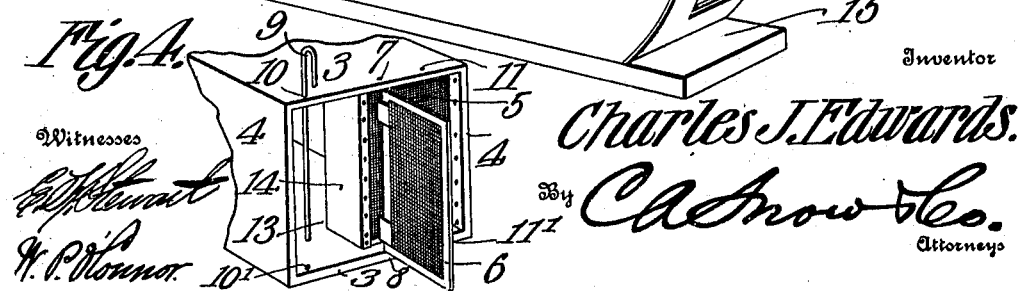

CHARLES J. EDWARDS, OF MARSHALL, MISSOURI, ASSIGNOR OF ONE-HALF TO JOHN W. PHILLIPS, OF MARSHALL, MISSOURI.

MOUSE-TRAP.

982,486.      Specification of Letters Patent.      Patented Jan. 24, 1911.

Application filed May 8, 1909. Serial No. 494,750.

*To all whom it may concern:*

Be it known that I, CHARLES J. EDWARDS, a citizen of the United States, residing at Marshall, in the county of Saline and State of Missouri, have invented a new and useful Mouse-Trap, of which the following is a specification.

My invention relates to animal traps and it has for its object to provide a trap which will always be set.

Another object is to facilitate the introduction and removal of bait from the trap.

Another object is to provide a device of this class in which the trap is removable from the cage, thereby permitting the latter to be used for housing the trapped animals, submerging them when so desired without wetting the trap proper, or for any other suitable purpose.

A further object is to provide a device of this character which can be locked to prevent the entrance of animals when their capture would be an inconvenience.

In the drawings:—Figure 1 shows a longitudinal section of the trap in operative position within its compartment of the cage. Fig. 2 is a plan view of the animal trap. Fig. 3 is a perspective view of the top, front, and one side of the removable trap. Fig. 4 is a perspective detail of the front of the cage.

The same numbers of reference indicate the same parts in both drawings and description.

My invention comprises a cage 1, and a removable trap 2. The cage 1 consists of a top and bottom 3—3, and two side walls 4—4 of any suitable material, an end covered with a wire mesh barrier and an opposite end divided into two parts, one of which is of suitable width to admit the removable trap 2 and the other of which is closed by a permanent metallic mesh barrier 5, set in somewhat from the edges, to house the gate 6 which is pivoted to the top and bottom at 7 and 8 and is capable of moving through a semi-circle for the purpose of closing the space occupied by the trap 2 when the trap has been removed, or it can be conveniently housed against the barrier 5 when the trap is within the cage. A locking pin 9, by engaging the openings 10 or 11 and the sockets 10' or 11', secures the gate in either its closed or open position. The guides 12 and 13 on the inner side of the top and bottom together with the post 14 secure a snug fit of the removable trap in the cage.

The removable trap 2 comprises a base 15 and vertical side walls 16 suitably fastened to the base, the side walls having straight vertical rear edges and convex front edges. A semi-cylindrical plate 17, preferably of sheet metal, is fastened to the front edges of the side walls and an aperture 18 is provided therein of suitable size to admit an animal of the kind for which the trap is intended. The top of the trap adjacent to the front end thereof is covered preferably by the extension 19 of the front plate 17 and to the inner extremity of this extension is suitably secured the inwardly curved wire screen 20 forming the front of the bait receptacle 21, the bottom 22 of which is of opaque material arranged parallel to the base of the trap, the rear end of the bait receptacle being closed by the screen 23 fastened to the bottom 22 and to the ends and adjacent parts of the upper edges of the side walls 16.

To facilitate the introduction and removal of bait, the bait receptacle is left open at the top, except for a short space adjacent the rear end where the screen or back wall 23 has been carried over the edges of the side walls. The rear wall 13, being foraminous, will admit light and air to the bait receptacle 21 and facilitate the transmission of the view and odor of the bait 35 through the screen 20, the pivoted tube 24 and the aperture 18 to animals that may be in the vicinity of the trap and to entice them by the sight and smell of the bait to pass through the aperture 18 and ascend the pivoted tube 24. The aperture 18 in the front wall of the trap is the entrance to the trap and may be of any desired shape but should register with the adjacent extremity of the pivoted tube 24 when the latter is empty. The tube is preferably rectangular in cross section and is suitably weighted at its front end to cause that end to normally rest on the bottom or base 15. Suitable pivots 25 are provided on the sides of the tube and have their ends engaging the side walls 16 in such a manner as to permit the tube to swing vertically. To the extremities of the tube and extending downward therefrom are secured the plates 26 and 27 which close and darken the entrances to the tube and the passage 28, respectively. These plates are curved and are practically segments of a cylinder formed by the revolution of the base of the tube 24 about its transverse axis. Above the base 15 is a false bottom 29 parallel to the bottom of the bait receptacle and so spaced from it that their inner faces, together with the portions of the inner faces of the sides of the trap included between them, form a chamber or passage 28, the inner extremity of which registers with that of the tube 24 when the latter is depressed until the plate 27 engages the base 15. The passage 28 has its outer extremity closed by a metallic screen door 30, the lower edge of which rests, at 31, upon the bottom 29 at the rear edge of the same, the upper end of said door being suitably hinged at 32 whereby it may swing vertically outward.

The animal entering the tube 24 will pass up the same toward the bait, but as soon as he passes to the rear of the pivots 25 his weight will cause the tube to turn and precipitate him into the passage 28. The light coming through the screen door 30 is the only light that can now reach him as the tube has returned to its original position and drawn the plate 27 over the entrance to the passage 28. The animal consequently tries to escape in the direction of the light and has no difficulty in raising the door 30 and entering the cage 1 whence there is no escape. The lower edge of the door 30 may be beveled or made very thin so as to prevent its being raised from the inside of the cage.

Having described my invention what I claim as new and useful in it and entitling me to Letters Patent is:—

In a device of the class described, a box-like trap provided with a transverse platform defining passage and a superposed bait chamber in the trap; a tube pivoted intermediate its ends in the trap and normally resting in inclined position with its ends disposed opposite the bait chamber and opposite an opening in the trap, the tube being terminally provided with depending plates, one of which serves as a closure for the opening when the tube is tilted to dispose its inner end opposite the passage and as a stop to dispose the outer end of the tube opposite the opening; the other of which plates serves as a closure for the passage when the tube is tilted to dispose its inner end opposite the bait-chamber and as a stop to dispose the inner end of the tube opposite the passage; the trap being open at the top to provide for the insertion of bait into the bait chamber; and a cage into which the trap is adapted to be slid, the passage communicating with the cage, and the top of the cage fitting closely upon the trap to serve as a closure for the bait chamber.

In testimony that I claim the foregoing as my own, I have hereto affixed my signature in the presence of two witnesses.

CHARLES J. EDWARDS.

Witnesses:
S. T. GRAY,
R. T. BRIGHTWELL.